B. D. Randleman,
Belt Fastener,

No. 80,219.     Patented July 21, 1868.

Witnesses
Wm. A. Morgan
G. C. Cotton

Inventor
B. D. Randleman
per Munn & Co
Attorneys

United States Patent Office.

BENJAMIN D. RANDLEMAN, OF PORT LOUISA, IOWA.

Letters Patent No. 80,219, dated July 21, 1868.

IMPROVED CLASP FOR JOINING BELTS.

*The Schedule referred to in these Letters Patent and making part of the same.*

TO ALL WHOM IT MAY CONCERN:

Be it known that I, BENJAMIN D. RANDLEMAN, of Port Louisa, in the county of Louisa, and State of Iowa, have invented a new and useful Improvement in Clasps for Joining Belts; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
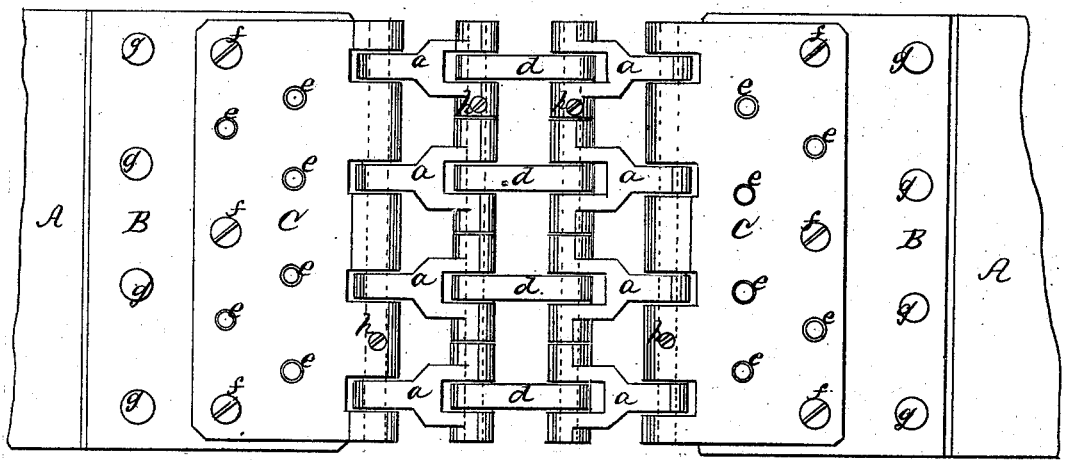
Figure 1 is a top view of my invention.
Figure 2:
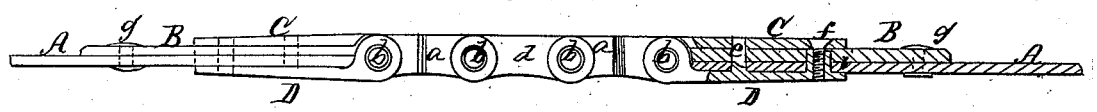
Figure 2 is a side view of the same, with a portion of the clasp broken away, to exhibit the rivet-studs and screws.

The object of this invention is to provide a simple and effective clasp for joining the ends of belts.

It consists of the combination of forked and straight links with a pair of hinged plates, the links serving to provide a flexible connection for the hinged plates, which latter serve to secure the ends of the belt.

In the accompanying drawings, A, on the ends of the belts B B, are short pieces of leather, riveted thereto at $g$ $g$, &c., for greater strength.

C D are the hinged plates.

$a$ $a$ $a$, &c., are the forked links, and $d$ $d$, &c., the straight links, pivoted in the forks of the links $a$ $b$, &c., the rods or pintles completing the joint of the links with the plates and with each other.

$e$ $e$, &c., are studs formed on the inner face of the plates D, and fitting into correspondent holes in the upper plates C.

$f$ $f$, &c., are screws for securing the plates together. These screws fit into a hollow threaded stud, $i$, formed on the lower plates, as shown.

When the belting is to be shortened or taken up, one line of forked links is removed by withdrawing the corresponding pintles $b$, and the free ends of the adjacent straight links are pivoted into the recesses of the hinged plates.

To fit this invention to a belt, the plates C are laid upon the ends of the belt, and the holes for the studs and screws are marked with a pencil or scratch-awl. The plates are then removed, and the holes formed with the ordinary belt-punch. The plates are then placed on again, and screwed up.

$h$ $h$ $h$ $h$ are set-screws, located in the eyes of the forked links and the hinged plates, for the purpose of preventing the escape of the pintles $b$.

Having thus described my invention, I claim as new, and desire to secure by Letters Patent—

A belt-clasp, composed of straight and forked links $d$ and $a$, and hinged plates C and D, all substantially as and for the purpose shown and described.

BENJAMIN D. RANDLEMAN.

Witnesses:
GEORGE HUTCHISON,
JACOB RANDLEMAN.